United States Patent [19]

Takase et al.

[11] Patent Number: 5,310,710
[45] Date of Patent: May 10, 1994

[54] MICROWAVE DIELECTRIC CERAMIC COMPOSITION

[75] Inventors: Masanori Takase; Hirofumi Ozeki, both of Nagoya, Japan

[73] Assignee: NGK Spark Plug Company, Ltd., Aichi, Japan

[21] Appl. No.: 864,357

[22] Filed: Apr. 6, 1992

[30] Foreign Application Priority Data

Apr. 9, 1991 [JP] Japan ............... 3-103820

[51] Int. Cl.$^5$ .............................. C04B 35/46
[52] U.S. Cl. ............................... 501/139; 501/137; 501/138
[58] Field of Search ............ 501/139, 137, 138

[56] References Cited

U.S. PATENT DOCUMENTS

| | | | |
|---|---|---|---|
| 5,077,247 | 12/1991 | Sato et al. ................ | 501/137 |
| 5,223,462 | 6/1993 | Okawa ....................... | 501/139 |
| 5,244,851 | 9/1993 | Takahashi et al. ....... | 501/139 |
| 5,256,639 | 10/1993 | Fujimaru et al. ......... | 501/139 |

FOREIGN PATENT DOCUMENTS

| | | | |
|---|---|---|---|
| 3545396 | 6/1987 | Fed. Rep. of Germany | C04B 35/46 |
| 50-020280 | 7/1975 | Japan ....................... | 501/139 |
| 53-074298 | 7/1978 | Japan ....................... | 501/139 |
| 62-187163 | 8/1987 | Japan ....................... | C04B 35/46 |
| 62-276706 | 12/1987 | Japan ....................... | C04B 35/46 |
| 63-079753 | 4/1988 | Japan ....................... | C04B 35/46 |
| 2239151 | 9/1990 | Japan ....................... | C04B 35/46 |

*Primary Examiner*—Anthony Green
*Attorney, Agent, or Firm*—Finnegan, Henderson, Farabow, Garrett & Dunner

[57] ABSTRACT

A dielectric ceramic composition which comprises a composition represented by $xBaO \cdot yNd_2O_3 \cdot zTiO_2$ (where $8.5 \leq x \leq 20$, $5 \leq y \leq 23$, $62 \leq z \leq 85$, and $x+y+z=100$), $Y_2O_3$ in an amount not more than 15 wt % of the amount of said composition, and $Al_2O_3$ in an amount not more than 2 wt % of the total amount of the principal components $BaO$, $Nd_2O_3$, $TiO_2$, and $Y_2O_3$. And a relative permittivity $\epsilon r$ of the dielectric ceramic is not less than 59, its dielectric loss (tan $\delta$) is $3 \times 10^{-4} \sim 8 \times 10^{-4}$ (2.7 GHz), and its temperature coefficient of resonant frequency $\tau f$ may be $-30 \sim +10$ ppm/°C. This microwave ceramic dielectric will be used for dielectric resonators in the microwave frequency region, microwave IC substrates, and impedance matching of microwave circuits.

6 Claims, No Drawings

MICROWAVE DIELECTRIC CERAMIC COMPOSITION

BACKGROUND OF THE INVENTION

1. Field of the Invention

The present invention relates to a ceramic composition to be made into a microwave ceramic dielectric, more particularly, to a ceramic composition to be made into a microwave ceramic dielectric which has a high Q value, a high relative permittivity, and a temperature coefficient permissible to practical use, and also exhibits its good quality invariably regardless of the firing temperature. The microwave ceramic dielectric will be used for dielectric resonators in the microwave frequency region, microwave IC substrates, and impedance matching of microwave circuits.

2. Prior Art

There is known a ceramic composition for a microwave ceramic dielectric (simply referred to as a dielectric ceramic composition hereinafter) which is composed of BaO, $Nd_2O_3$, and $TiO_2$ (as disclosed in Japanese Patent Laid-open No. 79753/1988). It has a disadvantage of being limited in the range of optimum firing temperature. In other words, it varies in characteristic properties (such as relative permittivity $\epsilon r$, temperature coefficient of resonant frequency $\tau f$, and Q value) depending on the firing temperature even though it has the same composition. This makes it difficult to obtain products of uniform quality. Moreover, it has a little high temperature coefficient of resonant frequency, i.e., +10 to 20 ppm/°C., whereas the desirable value is in the neighborhood of 0 ppm/°C.

SUMMARY OF THE INVENTION

The present invention was completed to eliminate the above-mentioned disadvantages. It is an object of the present invention to provide a ceramic composition which gives rise to a microwave ceramic dielectric which exhibits outstanding characteristic properties invariably regardless of the firing temperature.

The present inventors carried out a series of researches on a variety of dielectric ceramic compositions. As the result, it was found that the above-mentioned disadvantage can be eliminated if a composition composed mainly of BaO, $Nd_2O_3$, $TiO_2$, and $Y_2O_3$ is incorporated with a specific amount of $Al_2O_3$. The present invention is based on this finding.

The present invention is embodied in a dielectric ceramic composition which comprises a composition represented by $xBaO \cdot yNd_2O_3 \cdot zTiO_2$ (where $8.5 \leq x \leq 20$, $5 \leq y \leq 23$, $62 \leq z \leq 85$, and $x+y+z=100$), $Y_2O_3$ in an amount not more than 15 wt % of the amount of said composition, and $Al_2O_3$ in an amount not more than 2 wt % of the total amount of the principal components BaO, $Nd_2O_3$, $TiO_2$, and $Y_2O_3$.

According to the present invention, the amount of BaO is defined by the value of x which is from 8.5 to 20. If the value of x is smaller than 8.5, the resulting ceramic dielectric will have a low relative permittivity $\epsilon r$. If the value of x is greater than 20, the resulting ceramic dielectric will have a high dielectric loss (tan $\delta$). The amount of $Nd_2O_3$ is defined by the value of y which is from 5 to 23. If the value of y is smaller than 5, the resulting ceramic dielectric will have a high positive temperature coefficient of resonant frequency $\tau f$. If the value of y is greater than 23, the resulting ceramic dielectric will have a high dielectric loss (tan $\delta$). The amount of $TiO_2$ is defined by the value of z which is from 62 to 85. If the value of z is smaller than 62, the resulting ceramic dielectric will have a high dielectric loss (tan $\delta$). If the value of z is greater than 85, the resulting ceramic dielectric will have a high positive temperature coefficient of resonant frequency $\tau f$.

The additional component $Y_2O_3$ stabilizes the temperature coefficient without appreciably lowering the relative permittivity $\epsilon r$. If the amount of $Y_2O_3$ exceeds 15 wt %, the ceramic composition will vary in sinterability and the resulting ceramic dielectric will have a low Q value and a large negative temperature coefficient of resonant frequency $\tau f$.

The additional component $Al_2O_3$ minimizes the fluctuation of the Q value, relative permittivity $\epsilon r$, and temperature coefficient of resonant frequency $\tau f$, which depends on the firing temperature. It also stabilizes the quality of the sintered ceramic dielectric and controls the temperature coefficient of resonant frequency f as desired. If the amount of $Al_2O_3$ exceeds 2 wt %, the resulting ceramic dielectric will have a large negative temperature coefficient of resonant frequency $\tau f$ and a low relative permittivity $\epsilon r$.

As mentioned above, the dielectric ceramic composition of the present invention gives rise to a microwave ceramic dielectric which has characteristic properties for practical use (e.g., a high Q value, a low dielectric loss, a practical temperature coefficient, and a practical relative permittivity). The ceramic dielectric invariably has the stable quality of the sintered products regardless of the firing temperature.

DESCRIPTION OF THE PREFERRED EMBODIMENTS

The invention will be described in more detail with reference to the following examples.

EXAMPLE 1

This example demonstrates the proper range of the amount of each component. Four starting materials, $BaCO_3$ powder, $Nd_2O_3$ powder, $TiO_2$ powder, and $Y_2O_3$ powder, each having 99.9% purity, were weighed according to the formulations shown in Tables 1 to 3. (The amount of $Y_2O_3$ is expressed in terms of wt % of the total mixed amount of $BaCO_3$ powder, $Nd_2O_3$ powder, and $TiO_2$ powder.) They were mixed and crushed by dry process using a mixer, and the mixture was calcined at 1100° C. for 4 hours in the air. The calcined product was crushed together with an adequate amount of organic binder and water in a ball mill containing alumina balls. The crushed product was granulated by spray drying. The granules were formed into a cylinder, 19 mm in diameter and 14 mm high, by pressing at 1000 kg/cm². The molded article was fired in the air at 1300°–1450° C. for 0.5–4 hours. Finally, both ends of the fired article was polished to give a cylindrical article, about 16 mm in diameter and 10 mm in height. Thus there were obtained dielectric samples Nos. 1 to 36, 41 and 42.

TABLE 1

| Sample No. | Principal component (mol %) xBaO | yNd$_2$O$_3$ | zTiO$_2$ | Y$_2$O$_3$ (wt %) | $\epsilon_r$ | tan$\delta$ | $\tau_f$ (ppm/°C.) |
|---|---|---|---|---|---|---|---|
| *1  | *5.1 | *23.5 | 71.4  | 3.2 | *43.0 | *1.01 × 10$^{-3}$ | *−120 |
| *2  | 8.6  | *23.6 | 67.8  | 0.7 | 52.3  | *1.12 × 10$^{-3}$ | +13 |
| *3  | 9.1  | *3.5  | *87.4 | 1.2 | 78.0  | 5.40 × 10$^{-4}$ | *+213 |
| *4  | 9.1  | 5.0   | *85.9 | 2.3 | 75.0  | 6.00 × 10$^{-4}$ | *+179 |
| *5  | 16.7 | 22.2  | *61.1 | 8.4 | 30.2  | *2.50 × 10$^{-2}$ | +37 |
| *6  | 17.0 | 16.0  | 67.0  | *0  | 87.0  | 3.35 × 10$^{-4}$ | *+79 |
| 7   | 17.2 | 15.1  | 67.7  | 1.7 | 77.8  | 2.98 × 10$^{-4}$ | +52 |
| 8   | 17.3 | 14.3  | 68.4  | 3.6 | 76.7  | 3.06 × 10$^{-4}$ | +36 |
| 9   | 17.4 | 13.9  | 68.7  | 4.5 | 80.4  | 2.92 × 10$^{-4}$ | +30 |
| 10  | 17.5 | 13.4  | 69.1  | 5.5 | 80.1  | 3.05 × 10$^{-4}$ | +27 |
| 11  | 17.6 | 13.0  | 69.4  | 6.5 | 79.8  | 3.43 × 10$^{-4}$ | +19 |
| 12  | 17.7 | 12.5  | 69.8  | 7.5 | 77.8  | 3.88 × 10$^{-4}$ | +13 |

TABLE 2

| Sample No. | Principal component (mol %) xBaO | yNd$_2$O$_3$ | zTiO$_2$ | Y$_2$O$_3$ (wt %) | $\epsilon_r$ | tan$\delta$ | $\tau_f$ (ppm/°C.) |
|---|---|---|---|---|---|---|---|
| 13 | 17.7 | 12.5 | 69.8 | 7.5 | 78.8 | 3.67 × 10$^{-4}$ | +17 |
| 14 | 17.8 | 12.0 | 70.2 | 8.6 | 79.1 | 4.79 × 10$^{-4}$ | +12 |
| 15 | 17.8 | 12.2 | 70.0 | 8.6 | 77.6 | 3.37 × 10$^{-4}$ | +21 |
| 16 | 17.8 | 12.5 | 69.7 | 8.6 | 79.8 | 3.11 × 10$^{-4}$ | +20 |
| 17 | 17.8 | 12.8 | 69.4 | 6.5 | 78.8 | 4.16 × 10$^{-4}$ | +19 |
| 18 | 17.8 | 13.0 | 69.2 | 6.5 | 78.6 | 4.13 × 10$^{-4}$ | +20 |
| 19 | 17.9 | 11.8 | 70.3 | 7.6 | 78.3 | 4.20 × 10$^{-4}$ | +14 |
| 20 | 17.9 | 12.0 | 70.1 | 7.6 | 79.3 | 4.01 × 10$^{-4}$ | +16 |
| 21 | 17.9 | 12.3 | 69.8 | 7.6 | 79.2 | 5.23 × 10$^{-4}$ | +12 |
| 22 | 17.9 | 12.6 | 69.5 | 7.5 | 78.7 | 4.26 × 10$^{-4}$ | +16 |
| 23 | 18.0 | 11.3 | 70.7 | 8.7 | 76.8 | 6.99 × 10$^{-4}$ | +13 |
| 24 | 18.0 | 11.6 | 70.4 | 8.7 | 78.4 | 7.76 × 10$^{-4}$ | +9 |

TABLE 3

| Sample No. | Principal component (mol %) xBaO | yNd$_2$O$_3$ | zTiO$_2$ | Y$_2$O$_3$ (wt %) | $\epsilon_r$ | tan$\delta$ | $\tau_f$ (ppm/°C.) |
|---|---|---|---|---|---|---|---|
| 25  | 18.0  | 11.8  | 70.2  | 8.6   | 79.3 | 6.80 × 10$^{-4}$ | +9 |
| 26  | 18.0  | 12.1  | 69.9  | 8.6   | 79.9 | 5.49 × 10$^{-4}$ | +10 |
| 27  | 18.1  | 10.8  | 71.1  | 9.8   | 76.6 | 2.51 × 10$^{-3}$ | −9 |
| 28  | 18.1  | 11.1  | 70.8  | 9.7   | 76.9 | 1.82 × 10$^{-3}$ | +6 |
| 29  | 18.1  | 11.4  | 70.5  | 9.7   | 78.2 | 1.70 × 10$^{-3}$ | +4 |
| 30  | 18.1  | 11.6  | 70.3  | 9.7   | 78.2 | 1.33 × 10$^{-3}$ | −9 |
| *31 | 18.5  | 8.7   | 72.8  | *17.0 | 76.8 | *8.62 × 10$^{-3}$ | *−70 |
| *32 | 19.1  | 5.6   | 75.3  | *25.7 |      | *Unmeasurable |  |
| *33 | *20.2 | *0    | 79.8  | *45.4 |      | *Unmeasurable |  |
| *34 | *20.6 | 17.5  | *61.9 | 5.0   | 51.3 | *1.71 × 10$^{-3}$ | +143 |
| *35 | *21.1 | *26.3 | *52.6 | 7.3   |      | *Unmeasurable |  |
| *36 | *28.6 | 10.2  | *61.2 | 3.6   |      | *Unmeasurable |  |
| 40  | 9.1   | 12.5  | 78.4  | 7.5   | 64.5 | 1.32 × 10$^{-4}$ | −35 |
| 41  | 17.7  | 6.0   | 76.3  | 7.5   | 62.3 | 3.16 × 10$^{-4}$ | −38 |

The samples were tested for relative permittivity $\epsilon r$, dielectric loss (tan $\delta$), $Q_u$ value (unloaded Q), and temperature coefficient (20°-80° C.) of resonant frequency $\tau f$ by the parallel conductor plates type cylindrical dielectric resonator method, with the resonant frequency being 2-3 GHz.

The results are shown in Tables 1 to 3. Asterisks in these tables denote those unsatisfactory samples which do not pertain to the present invention. Samples Nos. 32, 33, 35, and 36 shown in Table 3 had such a small $Q_u$ value that they could not be tested for relative permittivity and temperature coefficient of resonant frequency.

Tables 1 to 3 show the following. Sample No. 1, in which the amount (x) of BaO is as small as 5.1 mol %, exhibits as low an $\epsilon r$ value as 43.0. Sample No. 34, in which the amount (x) of BaO is as large as 20.6 mol %, exhibits as high a tan $\delta$ value as 1.71×10$^{-3}$ and as high a $\tau f$ value as +143 ppm/°C. Sample No. 3, in which the amount (y) of Nd$_2$O$_3$ is 3.5, exhibits as high a $\tau f$ value as +213 ppm/°C. Samples Nos. 1 and 2, in which the amount (y) of Nd$_2$O$_3$ is as large as 23.5 mol % and 23.6 mol %, respectively, exhibit as high a tan $\delta$ value as 1.01×10$^{-3}$ and 1.12×10$^{-3}$, respectively. Sample No. 34, in which the amount (z) of TiO$_2$ is as small as 61.9, exhibits as high a tan $\delta$ value as 1.71×10$^{-3}$. Samples Nos. 3 and 4, in which the amount (z) of TiO$_2$ is as large as 87.4 mol % and 85.9 mol %, respectively, exhibit as high a $\tau f$ value as +213 ppm/°C. and +179 ppm/°C., respectively.

Moreover, it is noted that Y$_2$O$_3$ stabilizes the temperature coefficient in proportion to its amount without appreciably lowering the relative permittivity. However, Y$_2$O$_3$ in excess of 15 wt %, as in Example 31 containing 17%, makes the ceramic composition poor in sinterability and causes the ceramic dielectric to have a low $Q_u$ value (and hence a high tan $\delta$ value) and as high a negative $\tau f$ value as −70.

Samples Nos. 7 to 30, 40, and 41, which pertain to the present invention, exhibit $\epsilon r$ values from 60 to 80, $Q_u$ values from 700 to 2100, tan $\delta$ values from 1.0×10$^{-4}$ to $3.0 \times 10^{-3}$, and $\tau f$ values from $-40$ to $+50$ ppm/°C. These values are suitable for practical use.

EXAMPLE 2

This example demonstrates the effect of $Al_2O_3$. Four starting materials, $BaCO_3$ powder, $Nd_2O_3$ powder, $TiO_2$ powder, and $Y_2O_3$ powder, each having 99.9% purity, were weighed according to the formulations for samples Nos. 23, 24, and 12 in Tables 1 and 2. To the four components for Sample 12 was added 0.1 wt % $Al_2O_3$, 0.5 wt % $Al_2O_3$, 1 wt % $Al_2O_3$, and 2 wt % $Al_2O_3$ to give Samples Nos. 40, 37, 38, and 39, respectively. (The amount of $Al_2O_3$ is expressed in terms of wt % of the total amount of BaO, $Nd_2O_3$, $TiO_2$, and $TiO_2$.) They were mixed and crushed by dry process using a mixer, and the mixture was calcined at 1200° C. for 2 hours. The calcined product was crushed together with an adequate amount of organic binder and water in a ball mill containing alumina balls. The crushed product was granulated by spray drying. The granules were formed into a cylinder, 19 mm in diameter and 14 mm high, by pressing at 1000 kg/cm².

TABLE 4

| Sample No. | $Al_2O_3$ (wt %) | $\epsilon_r$ firing temperatures (°C.) below | | | | |
|---|---|---|---|---|---|---|
| | | 1300 | 1325 | 1350 | 1375 | 1400 |
| 23 | 0 | — | 66.2 | 77.7 | 77.5 | — |
| 24 | 0 | 66.9 | 76.4 | 76.2 | x | x |
| 12 | 0 | x | 77.9 | 80.1 | 80.7 | x |
| 37 | 0.5 | 59.4 | 73.5 | 73.1 | 72.1 | 71.9 |
| 38 | 1 | 66.3 | 69.1 | 67.9 | 67.2 | 65.6 |
| 39 | 2 | 60.7 | 62.8 | 61.2 | 56.4 | 54.7 |
| 40 | 0.1 | 70.2 | 29.4 | 79.2 | 78.5 | 75.3 |

TABLE 5

| Sample No. | $Al_2O_3$ (wt %) | Qu (2.7 GHz) at firing temp. (°C.) below | | | | |
|---|---|---|---|---|---|---|
| | | 1300 | 1325 | 1350 | 1375 | 1400 |
| 23 | 0 | — | 840 | 730 | 160 | — |
| 24 | 0 | 1470 | 790 | 810 | x | x |
| 12 | 0 | x | 1500 | 1480 | 1320 | x |
| 37 | 0.5 | 1900 | 1350 | 1100 | 770 | 425 |
| 38 | 1 | 1950 | 1580 | 1300 | 1160 | 980 |
| 39 | 2 | 1670 | 1890 | 1820 | 670 | 600 |
| 40 | 0.1 | 2030 | 1900 | 1850 | 1400 | 1000 |

TABLE 6

| Sample No. | $Al_2O_3$ (wt %) | $\tan \delta \times 10^{-4}$ at firing temp. (°C.) below | | | | |
|---|---|---|---|---|---|---|
| | | 1300 | 1325 | 1350 | 1375 | 1400 |
| 23 | 0 | — | 11.94 | 12.03 | 68.35 | — |
| 24 | 0 | 6.06 | 13.30 | 14.19 | x | x |
| 12 | 0 | x | 4.79 | 4.89 | 5.57 | x |
| 37 | 0.5 | 4.10 | 5.94 | 8.07 | 12.40 | 25.05 |
| 38 | 1 | 3.83 | 5.42 | 7.52 | 8.89 | 11.21 |
| 39 | 2 | 5.83 | 4.45 | 4.89 | 20.22 | 23.07 |
| 40 | 0.1 | 3.92 | 4.56 | 4.64 | 8.39 | 10.43 |

TABLE 7

| Sample No. | $Al_2O_3$ (wt %) | $\tau_f$ (ppm/°C.) at firing temp. (°C.) below | | | | |
|---|---|---|---|---|---|---|
| | | 1300 | 1325 | 1350 | 1375 | 1400 |
| 23 | 0 | — | 7.5 | 9.2 | −18.8 | — |
| 24 | 0 | 16.7 | −2.2 | −29.6 | x | x |
| 12 | 0 | x | 8.3 | 14.1 | 12.9 | x |
| 37 | 0.5 | −2.6 | −3.7 | −7.8 | −8.3 | −67.0 |
| 38 | 1 | −15.1 | −13.1 | −12.6 | −5.6 | −0.7 |
| 39 | 2 | −20.0 | −19.0 | −22.7 | −32.8 | −40.0 |
| 40 | 0.1 | −0.2 | −0.4 | −0.6 | −1.3 | −9.5 |

The molded article was fired in the air at 1300°–1400° C. (shown in Tables 4 to 7) for 3.5 hours. Finally, both ends of the fired article was polished to give a cylindrical article, about 16 mm in diameter and 8 mm in height. Thus there were obtained dielectric samples Nos. 23, 24, 12, 37, 38, and 39. Incidentally, Samples Nos. 23, 24, and 12 have the same composition as those in Example 1.

The samples were tested for relative permittivity $\epsilon r$, dielectric loss (tan δ), $Q_u$ value (unloaded Q), and temperature coefficient of resonant frequency $\tau f$ in the same manner as in Example 1. The characteristic properties at different firing temperatures are shown in Tables 4 to 7. (The mark "—" denotes that no measurements were made and the mark "x" denotes that the sample gave no resonance.)

Tables 4 to 7 show the following. Samples Nos. 23, 24, and 12, which contain no $Al_2O_3$, have a narrow range of firing temperatures (1325°–1375° C.). Outside this range, the resulting ceramic dielectrics have unmeasurable $\epsilon r$ values, $Q_u$ values, tan δ values, and $\tau f$ values.

Samples Nos. 37 to 40, which contain not more than 2.0 wt % $Al_2O_3$, have a broad range of firing temperatures (1300°–1400° C.). Even those samples which were fired at the lower end or higher end of this range, particularly have the characteristic values that can be measured. The ceramic dielectrics fired at 1300°–1375° C. gave stable characteristic values. Particularly the ceramic dielectrics fired at 1300°–1350° C. gave characteristic values as follows which are satisfactory for practical use. $\epsilon r = 59$–80, $Q_u = 1100$–2030 (2.7 GHz), tan $\delta = 4.1$–$8.1 \times 10^{-4}$ (2.7 GHz), and $\tau f = -23$ to $-0.2$ ppm/°C.

Not only does $Al_2O_3$ bring the $\tau f$ value close to zero but it also permits the ceramic dielectric to have a positive or negative $\tau f$ value as desired. For example, while sample No. 12, which was fired at 1325° C. without $Al_2O_3$, has a $\tau f$ value of $+8.3$ ppm/°C., this value is shifted toward the negative side, i.e., $-0.4$ ppm/°C., $-3.7$ ppm/°C. and $-13.1$ ppm/°C. respectively as the amount of $Al_2O_3$ is increased to 0.1 wt %, 0.5 wt % and 1.0 wt %. This suggests that samples containing not more than 0.5 wt % $Al_2O_3$ would have a $\tau f$ value close to 0 ppm/°C.

Obviously many modifications and variations of the present invention are possible in the light of the above teachings. In other words, the calcination and firing may be carried out under various conditions, and the $BaCO_3$ as a raw material of BaO may be replaced by a peroxide, hydroxide, or nitrate.

What is claimed is:

1. A microwave dielectric ceramic composition which comprises a composition represented by $xBaO \cdot yNd_2O_3 \cdot zTiO_2$ (where $8.5 < x < 20$ mol %, $5 < y < 23$ mol %, $62 < z < 85$ mol %, and $x + y + z = 100$ mol %), $Y_2O_3$ in an amount of 5 to 15 wt % of the amount of said composition, and $Al_2O_3$ in an amount of 0.1 to 2 wt % of the total amount of the principal components BaO, $Nd_2O_3$, $TiO_2$, and $Y_2O_3$.

2. A microwave dielectric ceramic composition as defined in claim 1, wherein $17.0 \leq x \leq 19.5$, $10 \leq y \leq 16$, and $67 \leq z \leq 72$.

3. A microwave dielectric ceramic composition as defined in claim 1, wherein the amount of $Y_2O_3$ is 5–9 wt %.

4. A microwave dielectric ceramic composition as defined in claim 2, wherein the amount of $Y_2O_3$ is 5–9 wt %.

5. A microwave dielectric ceramic composition as defined in one of claims 1-4, wherein the amount of $Al_2O_3$ is 0.1-0.5 wt %.

6. A microwave dielectric ceramic composition which comprises a composition represented by $xBaO \cdot yNd_2O_3 \cdot zTiO_2$ (where $8.5 < x < 20$ mol %, $5 < y < 23$ mol %, $62 < z < 85$ mol %, and $x+y+z = 100$ mol %), $Y_2O_3$ in an amount of 5 to 9 wt % of the amount of said composition, and $Al_2O_3$ in an amount of 0.1 to 0.5 wt % of the total amount of the principal components BaO, $Nd_2O_3$, $TiO_2$, and $Y_2O_3$, and a relative permittivity $\epsilon r$ is not less than 59, a dielectric loss (tan $\delta$) is $3 \times 10^{-4}$ to about $8 \times 10^{-4}$ (2.7 GHz), and a temperature coefficient of resonant frequency is $\tau f$ $-30$ to about $+10$ ppm/°C.

* * * * *

UNITED STATES PATENT AND TRADEMARK OFFICE
CERTIFICATE OF CORRECTION

PATENT NO. : 5,310,710
DATED : May 10, 1994
INVENTOR(S) : Masanori Takase et al.

It is certified that error appears in the above-indentified patent and that said Letters Patent is hereby corrected as shown below:

Claim 1, column 6, line 53;

Claim 6, column 7, line 6;

The Abstract, line 2;
and the specification; column 1, line 54;
change "x BaO.yNd2O3 zTiO2 " to -- $xBaO \cdot yNd_2O_3 \cdot zTiO_2$ --

Signed and Sealed this

Twenty-seventh Day of December, 1994

Attest:

BRUCE LEHMAN

*Attesting Officer*         *Commissioner of Patents and Trademarks*